(12) United States Patent
Woker et al.

(10) Patent No.: US 8,446,670 B2
(45) Date of Patent: *May 21, 2013

(54) CONVERGENCE ADJUSTMENT MECHANISM

(75) Inventors: Gary Woker, Escondido, CA (US);
John Duval, Long Beach, CA (US);
Keith Tholin, San Clemente, CA (US);
Jack Greelis, Carlsbad, CA (US)

(73) Assignee: Perioptix, Inc., San Clemente, CA (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/629,848

(22) Filed: Dec. 2, 2009

(65) Prior Publication Data

US 2010/0079859 A1 Apr. 1, 2010

Related U.S. Application Data

(63) Continuation-in-part of application No. 11/269,464, filed on Nov. 8, 2005, now Pat. No. 7,675,678.

(51) Int. Cl.
*G02B 23/18* (2006.01)

(52) U.S. Cl.
USPC .......................................... 359/419

(58) Field of Classification Search
None
See application file for complete search history.

(56) References Cited

U.S. PATENT DOCUMENTS 7,675,678 B2 * 3/2010 Woker et al. .................. 359/412

* cited by examiner

*Primary Examiner* — Derek S Chapel
(74) *Attorney, Agent, or Firm* — Merle W. Richman, Esq

(57) ABSTRACT

Improvement to an adornable binocular device having a telescope pair including a pivoting coupling between each telescope and arm and a second releasably slidable coupling between each telescope and arm.

21 Claims, 7 Drawing Sheets

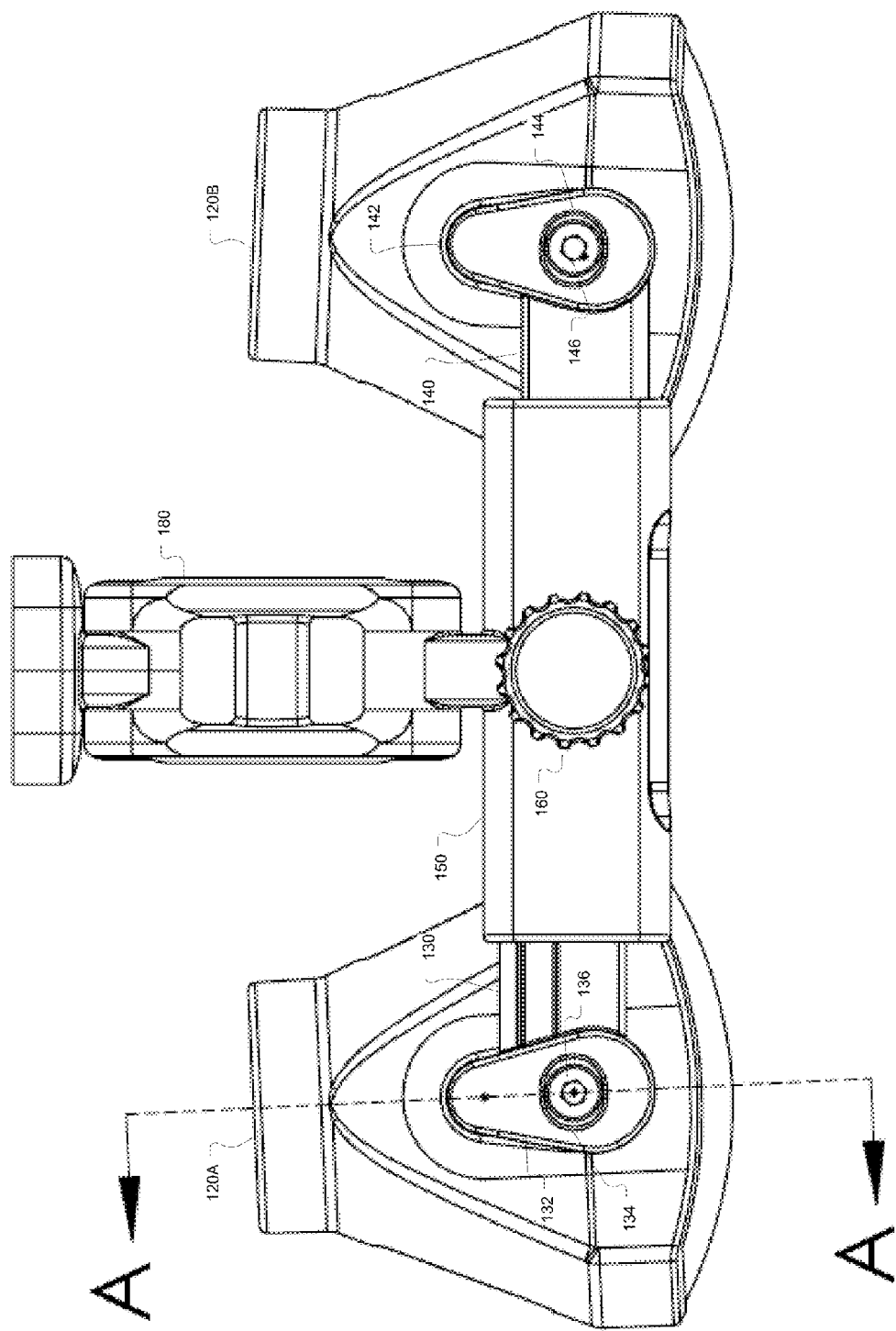

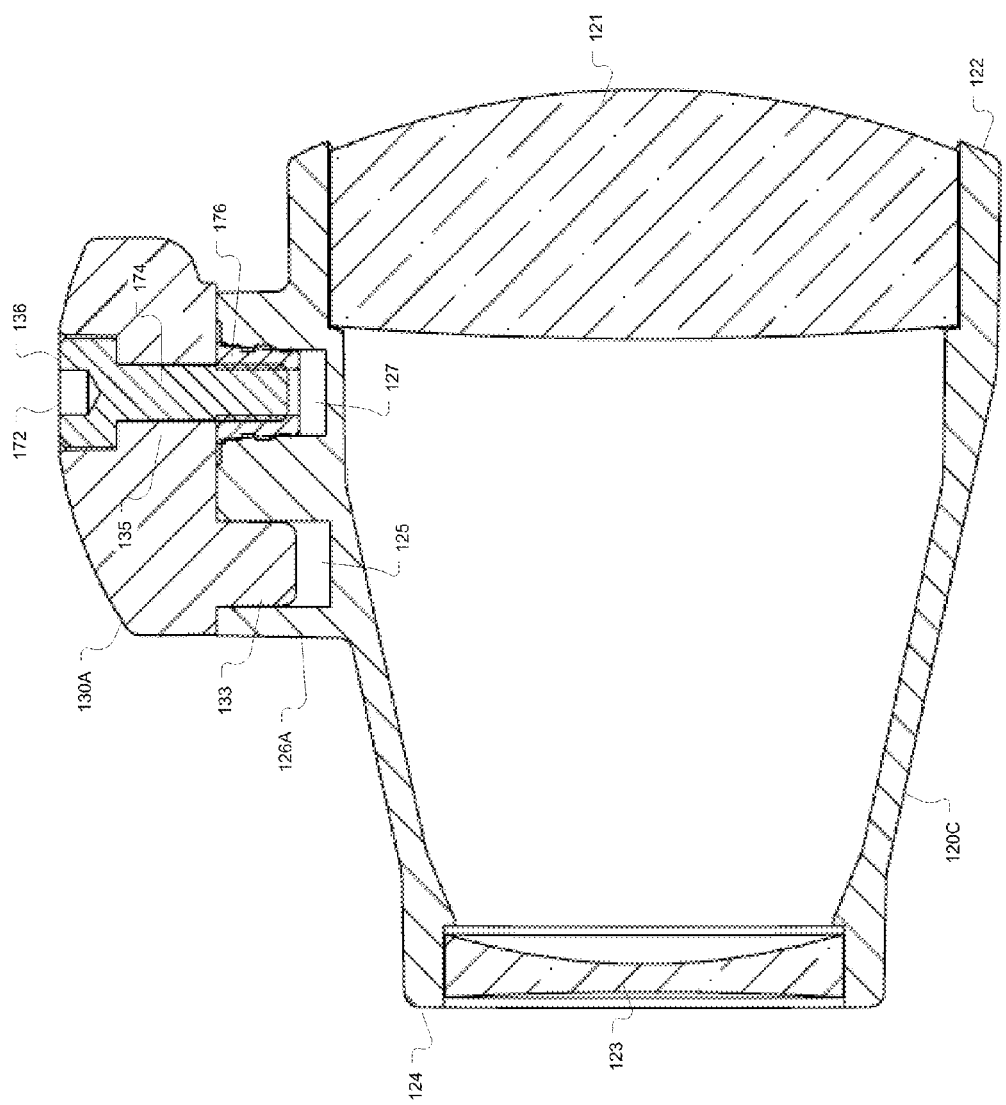

CONVERGENCE ADJUSTMENT MECHANISM

CROSS REFERENCE TO RELATED APPLICATIONS

The present application is a continuation-in-part of U.S. application Ser. No. 11/269,464, entitled "Locking Inter-Pupillary Distance and Convergence Adjustment Mechanism", filed on Nov. 8, 2005, the entirety of which is incorporated by reference.

BACKGROUND

1. Field of the Invention

The invention relates generally to adjustable binocular devices, and more particularly, to adjustable binocular loupes.

2. Description of Related Art

In some adornable binocular devices a user may need to adjust the convergence between the telescopes of the binocular device. It is desirable that such adjustments are simple and stable. The present invention provides simple and stable convergence adjustment systems for adornable binocular devices.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2A is a top view of a binocular system in accordance with another embodiment of the present invention.

FIG. 2B is a sectional view of the binocular system shown in FIG. 2A taken along the line AA in accordance with an embodiment of the present invention.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1A:
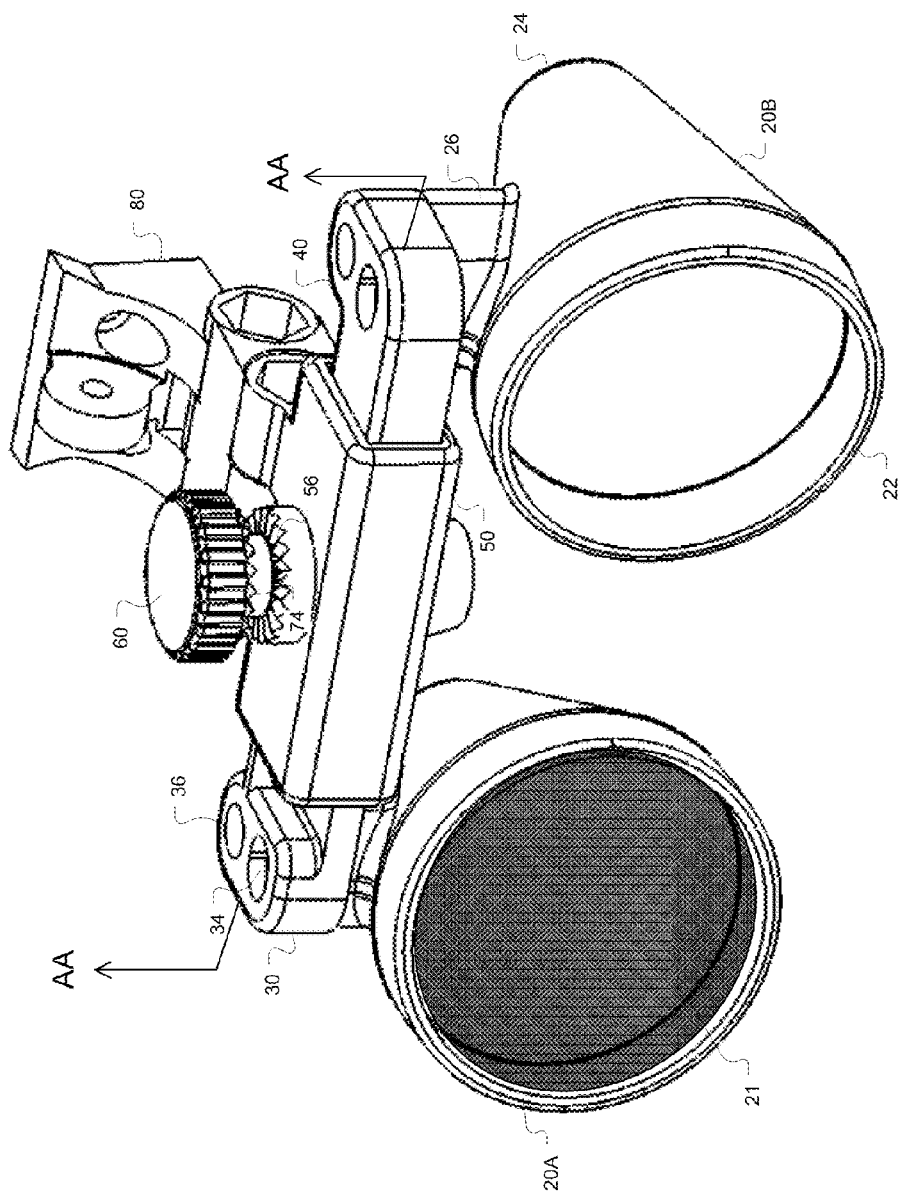
FIG. 1A is an isometric view of a binocular system in accordance with an embodiment of the present invention.
Figure 1B:
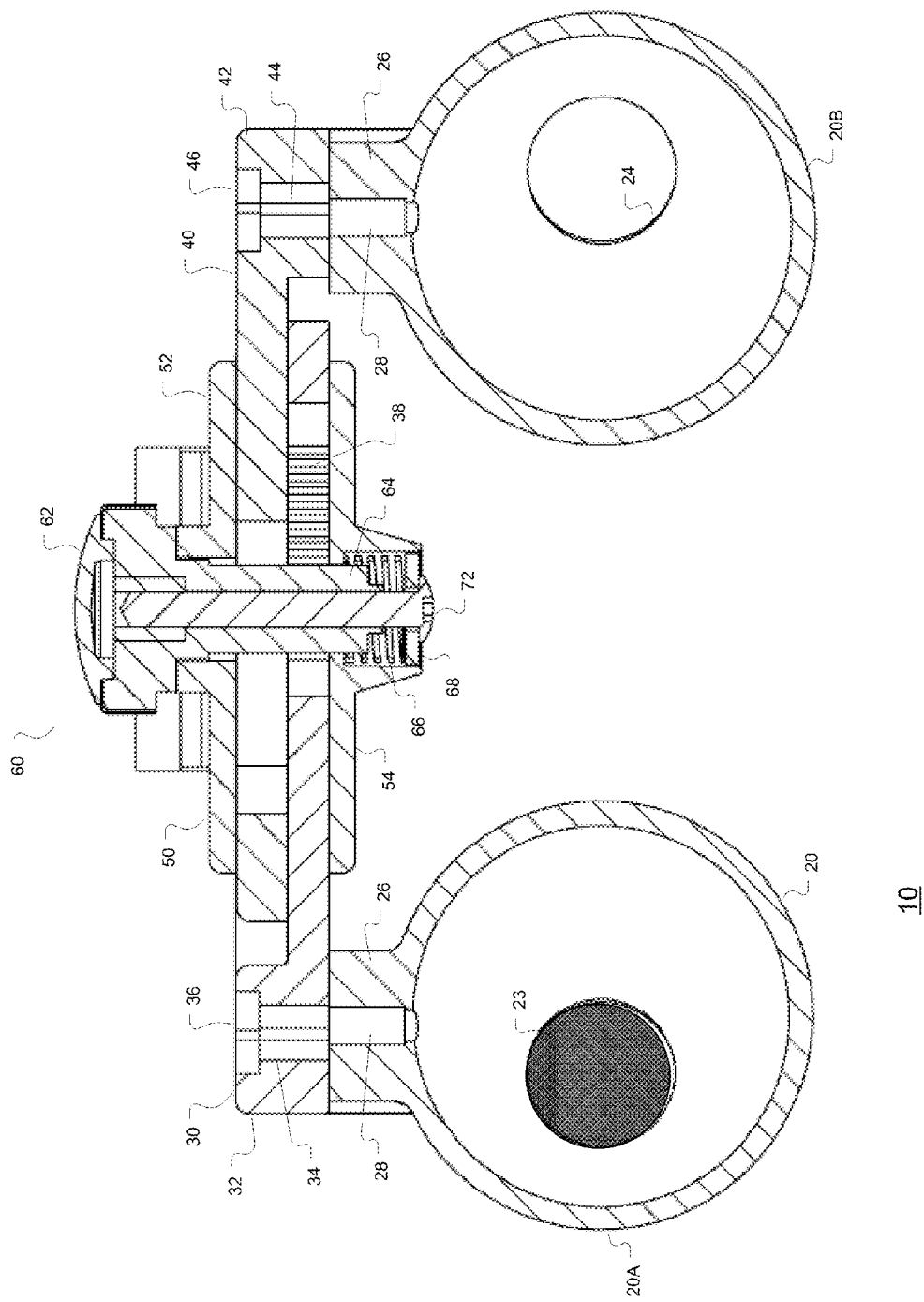
FIG. 1B is a sectional view of the binocular system shown in FIG. 1A taken along the line AA.
Figure 1C:
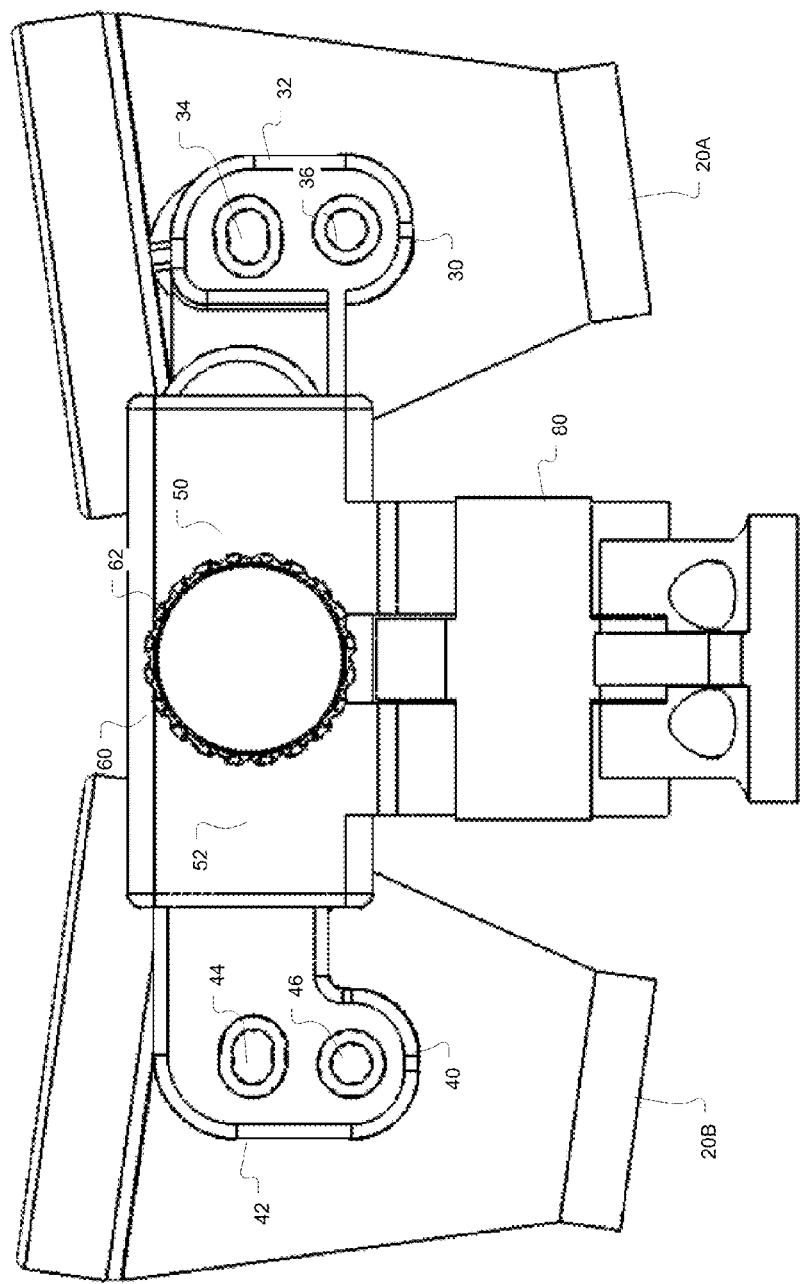
FIG. 1C is a top view of the binocular system shown in FIG. 1A.

FIG. 1A is an isometric view of a binocular system or loupes 10 in accordance with an embodiment of the present invention. FIG. 1B is a sectional view of the binocular loupes 10 shown in FIG. 1A taken along the line AA. FIG. 1C is a top view of the binocular loupes 10 shown in FIG. 1A. The binocular loupes 10 include a telescope or barrel pair 20, a housing 50, a right barrel to housing arm 30, a left barrel to housing arm 40, an inter-pupillary distance (IPD) adjustment mechanism 60, and a mount 80. The loupes 10 may adorned by a user via the mount 80 where the mount 80 is coupled to device(s) that enable the user to place the loupes 10 in their vision pathway, e.g., the devices may include spectacles or a head band. The mount 80 is coupled the housing 50. In an embodiment, the mount 80 may be incorporated in the housing 50.

In an embodiment each barrel 20A, B has a front 22, a back 24, and a housing arm extension 26, and screw openings 28. The barrel or telescope 20A, B may include one or more lens located between, near, or at the barrel or telescope front 22 and back 24. In FIG. 1A, a lens 21 is shown in right barrel 20A front 22 and in FIG. 1B a lens 23 is shown in the right barrel 20A rear 23. Lenses are not shown in the left barrel 20B in these figures for the sake of clarity. The right barrel 20A to housing arm 30 moveably couples the barrel 20A via an extension 26 to the housing 50. The left barrel to housing arm 40 moveably couples the other barrel 20B via its extension 26 to the housing 50. In an embodiment, the right arm 30 includes a rail having an end 32, a gear rack 38, a partial radial or elongated screw slot 34, and a pivot screw hole 36. In this embodiment the left arm 40 also includes a rail having an end 42, a gear rack 38 a partial radial screw slot 44, and a pivot screw hole 46. In this embodiment 10 each barrel extension 26 includes a front screw hole 28 aligned with a corresponding slot 34, 44.

In an embodiment the barrels 20A, 20B may be made to focus at a distance nearer than infinity. In such an embodiment the line of sight of the two lenses 23, 21 of each barrel 20A, 20B may be aligned so they meet or focus at a desired working distance. Accordingly, the barrels 20A, B may need to be pointed angularly horizontally inward to cause their lines of sight to cross at the desired working distance, termed the "convergence angle". The "convergence angle" may be adjusted for different working distances and various users' eye spacing or inter-pupillary distance (IPD.)

As shown in FIG. 1C, in an embodiment the right rail 30 partial radial or elongated screw slot 34 may be oriented to a barrel 20A front 22 to engage the barrel 20A extension 26 front screw hole 28. In the embodiment, the right rail 30 pivot screw hole 36 may be oriented to a barrel rear 24 to engage a barrel 20 extension 26 rear screw hole. Similarly, the left rail 40 partial radial or elongated screw slot 44 may be oriented to a barrel 20B front 22 to engage the barrel 20 extension 26 front screw hole 28. The left rail 40 pivot screw hole 46 may be oriented to the barrel rear 24 to engage a barrel 20 extension 26 rear screw hole In another embodiment the pivot screw hole 36, 46 may be oriented to a barrel front 22 or adjacent the slot 34, 44 to engage a barrel 20 extension 26 front screw hole 28 and the partial radial or elongated screw slot 34, 44 may be oriented to a barrel rear 22 or adjacent the slot 36, 46 to engage a barrel 20 extension 26 rear screw hole. In an embodiment different mechanical elements may be employed in the slots 34, 44 or holes 36, 46 and the extension 26 holes including a threaded screw and the screw or bolt could be coupled to a cam based element that is rotated from a free, non-compressive state to an active, compressive state.

The radial or elongated section of the slot 34 and 44 of the arms 30, 40 may be selected to permit about 2 to 8 degrees of movement of the barrel front 22 relative the barrel rear 24 via the pivot slot 36, 46. This enables a user to adjust or set the convergence angle between the two barrels 20A, B or telescope pair 20 and then stably lock each barrel 20A, B via its extension 26 to an arm 30, 40 via a first screw passing the arm 30, 40 pivot screw hole 36, 46 into a corresponding barrel extension 26 screw hole and a second screw passing through the arm 30, 40 partial radial screw slot 34, 44 into the barrel extension 26 screw hole 28.

In an embodiment the binocular loupes 10 IPD adjustment mechanism 60 may include an adjustment knob 62 having a plurality of teeth 74, a pinion gear 64 coupled to the knob 62, spring 66, washer 68, and spring retaining screw 72. The pinion gear 64 simultaneously engages the right arm 30 gear rack 38 and the left arm 40 gear rack 38. In an embodiment, the right and left gear racks have the same gear spacing. In this embodiment rotation of the pinion gear 64 via the knob 62 in either direction causes both arms 30, 40 to move approximately equal distances relative to the knob, inward to outward to change the distance between the barrels and effective IPD for a user adorning the loupes 10. In this embodiment, both the housing 50 and knob 62 have mating teeth 56, 74 respectively. In an embodiment the housing 50 and knob 62 each have about 20 teeth spaced 18 degrees apart. In the loupes 10 the spring 66 is biased against the housing 50 bottom 54 and washer 68 where the washer is coupled to the knob 62 via the retaining screw 72.

In stasis, the spring 66 causes the knob teeth 74 to stably mate to the housing teeth 56 to maintain the IPD between the barrel or telescope pair 20. To change the IPD, a user pulls the knob axially upward relative to the spring 66 axis to disengage the knob teeth 74 from the housing teeth 56, rotates the knob 62 about the axis in a direction to cause the arms 30, 40 to move inward or outward approximately equal distances simultaneously, and then releases the knob 62. The spring 66 bias then exerts sufficient axial downward force to re-engage the knob teeth 74 to the housing teeth 56, securing the selected IPD distance and limit unintentional IPD modification. In an embodiment, the spring constant is about 6 to 13 pounds per inch.

Figure 2C:
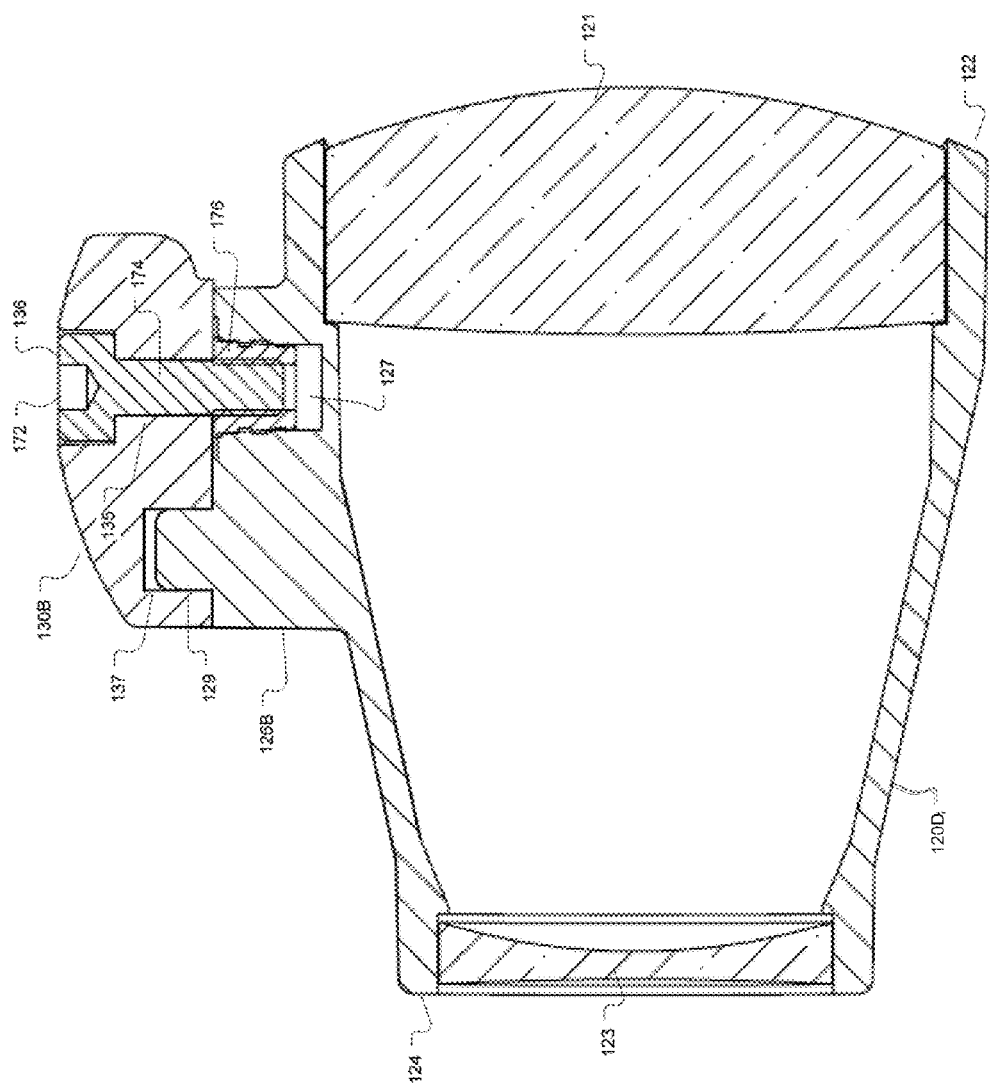
FIG. 2C is a sectional view of the binocular system shown in FIG. 2A taken along the line AA in accordance with an embodiment of the present invention.
Figure 2D:
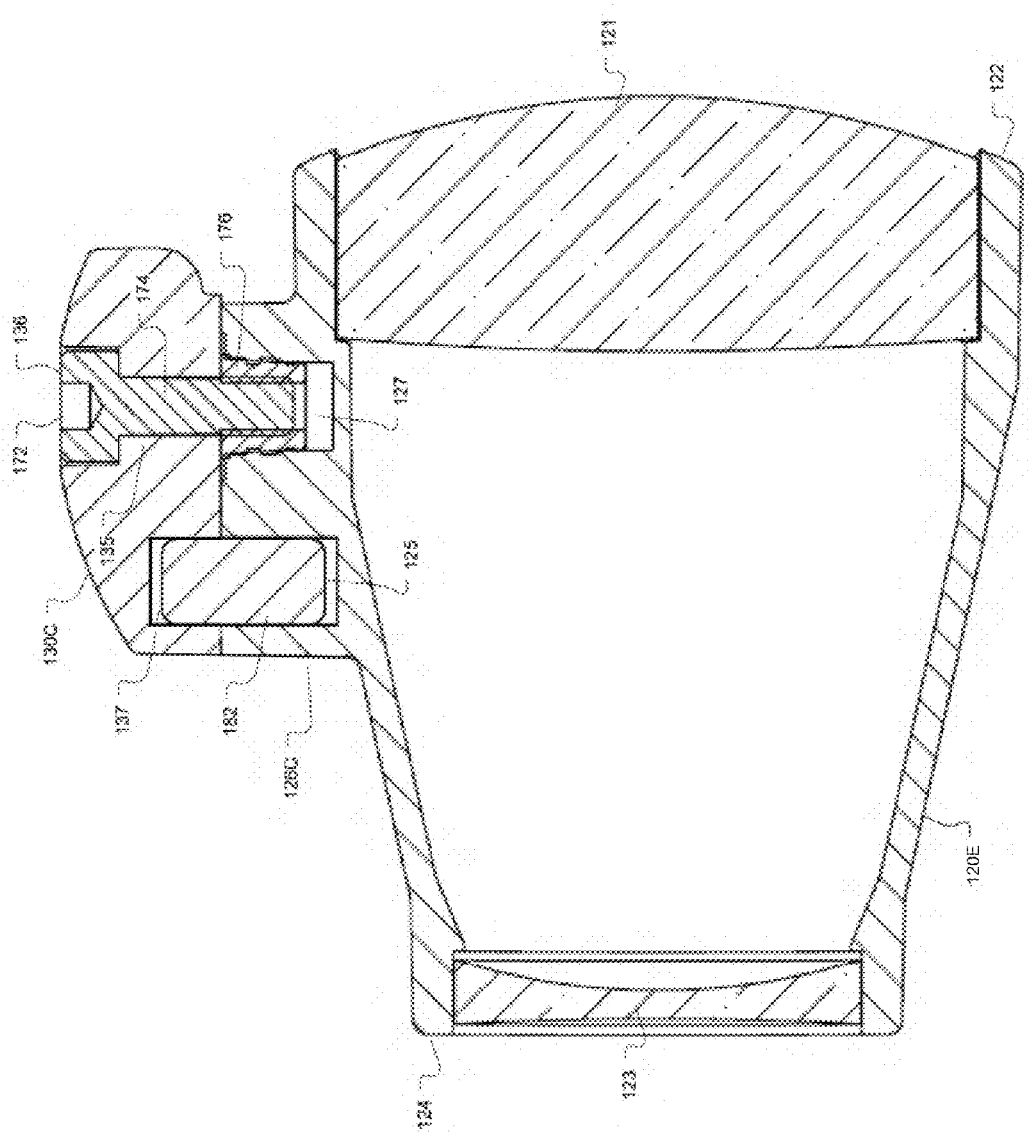
FIG. 2D is a sectional view of the binocular system shown in FIG. 2A taken along the line AA in accordance with an embodiment of the present invention.

FIG. 2A is a top view of a binocular system or loupes 100 in accordance with another embodiment of the present invention. FIGS. 2B, 2C, and 2D are sectional views of the binocular loupes 100 shown in FIG. 2A taken along the line AA according to various embodiments 100A, 100B, and 100C. The binocular loupes 100 include a telescope or barrel pair 120A, B, a housing 150, a right barrel to housing arm 130, a left barrel to housing arm 140, an IPD adjustment mechanism 160, and a mount 180. The loupes 100 may adorned by a user via the mount 180 where the mount 180 is coupled to device(s) that enables the user to place the loupes 100 in their vision pathway, e.g., the devices may include spectacles or a head band. The mount 180 is coupled the housing 150. In an embodiment, the mount 180 may be incorporated in the housing 150.

In an embodiment, each barrel 120 has a front 122, a back 124, and a housing arm extension 126A, B, C, and a locking mechanism hole or cavity 127. The barrel or telescope 120 may include one or more lens located between, near, or at the barrel or telescope front 122 and back 124, such as a lens 121 shown in the barrel front 122 and a lens 123 as shown in the barrel rear 122. In an embodiment, the right arm 130 includes an end 132 and a partially elongated or radial slot 134. The left arm 140 also includes an end 142 and partially elongated or radial slot 144. A screw, bolt or other similar locking mechanism 136, 146 may pivotably couple an arm 130, 140 to a barrel 120 via the partially elongated or radial slot 134, 144. In an embodiment, the slot 134, 144 and locking mechanism 136, 146 head 172 are dimensioned to permit the head 172 to have 2 to 10 degrees of movement of each barrel 120 relative to an arm 130, 140 and a pivoting coupling (125, 133 in FIG. 2B) (137, 129 in FIG. 2C) (125, 137, 182 in FIG. 2D).

In an embodiment, the partially elongated or radial slots 134, 144 may be oriented to a barrel front 122. A pin hole and at least a partially circular pin set (125, 133 in FIG. 2B) (135, 129 in FIG. 2C) (125, 135, 182 in FIG. 2D) may be oriented to a barrel rear 124 or adjacent the slots 134, 144 to pivotably engage a barrel 120A, B, C, D, E. In another embodiment, the partially elongated or radial slots 134, 144 may be oriented to a barrel rear 124. A pin slot and at least a partially circular pin set (125, 133 in FIG. 2B) (137, 129 in FIG. 2C) (125, 137, 182 in FIG. 2D) may be oriented to a barrel front 122 or adjacent the slots 134, 144 to pivotably engage the barrel 120A, B, C, D, E. In an embodiment various mechanical elements may be employed in the slots 134, 144 including a threaded bolt or screw 136, 146 and the screw 136, 146 could be coupled to a metal, ceramic, or polymer threaded insert 176, cam based element that is rotated from a free, non-compressive state to an active, compressive state, swage or other screw engaging mechanism.

As noted the elongated or radial slot 134, 144 of the arms 130, 140 is dimensioned to enable about 2 to 10 degrees of movement of the barrel front 122 relative the barrel rear 124 via the pivot set (125, 133 in FIG. 2B) (135, 129 in FIG. 2C) (125, 135, 182 in FIG. 2D). The arm 130, 140 and barrel 120C, D, E configurations may enable a user to adjust or set the convergence angle between barrel 120A, B, C, D, E or a telescope pair 120. A user may stably lock each barrel 120A, B, C, D, E via its extension 126 to an arm 130, 140 via the combination of the locking mechanisms 136, 146 in the elongated or radial slots 134, 144 and a pivot set (125, 133 in FIG. 2B) (137, 129 in FIG. 2C) (125, 137, 182 in FIG. 2D).

As noted, FIG. 2B is a sectional view of a right barrel 120C coupled to an arm 130A of binocular loupes 100 shown in FIG. 2A taken along the line AA according to an embodiment 100A. In embodiment 100A, the barrel 120C extension 126A may include a front slot or cavity 127 and a rear hole or cavity 125. The arm 130A may include a rear at least partially circular pin or protrusion 133 and locking mechanism opening or slot 135 that enables a locking mechanism 136 having a head 172 and shaft 174 to pass into the front extension 126A cavity 127. The locking mechanism 136 may include external, distal threads or grooves on the shaft 174 that may mate with internal threads or grooves of the threaded insert 176. The threaded insert 176 may be securely coupled to the barrel 120 extension 126A cavity 127. In an embodiment, the barrel 120A extension 126A cavity 127 may include internal threads or grooves that mate with the locking mechanism 136 shaft 174 external threads or grooves. The pin or protrusion 133 may be dimensioned to rotatably fit within the extension 126A cavity 125. The pin or protrusion 133 may be partially circular given the limited degrees of rotation (2 to 10 degrees).

To adjust or set a desired convergence angle a locking mechanism 136 may be rotated via its head 172 in a direction that causes the mechanism 136 to back out of the cavity 127 and opening 135 and release or reduce any compressive force or friction between the arm 130A and extension 126A and between the head 172 and elongated or radial slot 134. The barrel 120C may then be rotated about the pin or protrusion 133 and within the elongated or radial slot 134 to modify the effective line of sight of the barrel 120C and thus the convergence of a barrel pair 120A, B, C, D, E. To maintain the desired line of sight of the barrel 120C or convergence of the barrel pair 120A, B, C, D, E, the locking mechanism 136 may be rotated via its head 172 in a direction that causes the mechanism 136 shaft 174 to move in towards the cavity 127 and reversibly increase or create a compressive force or friction between the arm 130 and extension 126A and between the head 172 and elongated or radial slot 134.

FIG. 2C is a sectional view of a right barrel 120D coupled to an arm 130B of binocular loupes 100 shown in FIG. 2A taken along the line AA according to another embodiment 100B. In the embodiment 100B the barrel 120D extension 126B may include a front slot or cavity 127 and a rear at least partially circular pin or protrusion 129. The arm 130B may include a rear cavity 137 and a locking mechanism opening or slot 135 that enables a locking mechanism 136 having a head 172 and shaft 174 to pass into the front extension 126B cavity 127. The locking mechanism 136 may include external, distal threads or grooves on the shaft 174 that may mate with internal threads or grooves of the threaded insert 176. The threaded insert 176 may be securely coupled to the barrel 120D extension 126B cavity 127. In an embodiment, the barrel 120D extension 126B cavity 127 may include internal threads or grooves that mate with the locking mechanism 136 shaft 174 external threads or grooves. The pin or protrusion 129 may be dimensioned to rotatably fit within the arm 130B cavity 137. The pin or protrusion 129 may be partially circular given the limited degrees of rotation (2 to 10 degrees).

To adjust or set a desired convergence angle a locking mechanism 136 may be rotated via its head 172 in a direction that causes the mechanism 136 to back out of the cavity 127 and opening 135 and release or reduce any compressive force or friction between the arm 130B and extension 126B and between the head 172 and elongated or radial slot 134. The barrel 120D may then be rotated about the pin or protrusion 129 and within the elongated or radial slot 134 to modify the effective line of sight of the barrel 120D and thus the convergence of a barrel pair 120A, B, C, D, E. To maintain the desired line of sight of the barrel 120D or convergence of the barrel pair 120A, B, C, D, E, the locking mechanism 136 may be rotated via its head 172 in a direction that causes the mechanism 136 shaft 174 to move in towards the cavity 127 and reversibly increase or create a compressive force or friction between the arm 130B and extension 126B and between the head 172 and elongated or radial slot 134.

FIG. 2D is a sectional view of a right barrel 120E coupled to an arm 130C of binocular loupes 100 shown in FIG. 2A taken along the line AA according to another embodiment 100C. In the embodiment 100C the barrel 120E extension 126C may include a front slot or cavity 127 and a rear cavity 125. The arm 130C may include a rear cavity 137 and a locking mechanism opening or slot 135 that enables a locking mechanism 136 having a head 172 and shaft 174 to pass into the front extension 126C cavity 127. An at least partially circular pin or protrusion 182 may be dimensioned to rotatably fit one of or both of the extension 126C cavity 125 and the arm 130C cavity 137. In an embodiment, the pin or protrusion 182 may be configured to compressively fit within one of the extension 126C cavity and the arm 130C cavity 137.

The locking mechanism 136 may include external, distal threads or grooves on the shaft 174 that may mate with internal threads or grooves of the threaded insert 176. The threaded insert 176 may be securely coupled to the barrel 120E extension 126C cavity 127. In an embodiment, the barrel 120E extension 126C cavity 127 may include internal threads or grooves that mate with the locking mechanism 136 shaft 174 external threads or grooves.

To adjust or set a desired convergence angle a locking mechanism 136 may be rotated via its head 172 in a direction that causes the mechanism 136 to back out of the cavity 127 and opening 135 and release or reduce any compressive force or friction between the arm 130C and extension 126C and between the head 172 and elongated or radial slot 134. The barrel 120E may then be rotated about the pin or protrusion 182 and within the elongated or radial slot 134 to modify the effective line of sight of the barrel 120E and thus the convergence of a barrel pair 120A, B, C, D, E. To maintain the desired line of sight of the barrel 120E or convergence of the barrel pair 120A, B, C, D, E, the locking mechanism 136 may be rotated via its head 172 in a direction that causes the mechanism 136 shaft 174 to move in towards the cavity 127 and reversibly increase or create a compressive force or friction between the arm 130C and extension 126C and between the head 172 and elongated or radial slot 134.

While this invention has been described in terms of a best mode for achieving the objectives of the invention, it will be appreciated by those skilled in the art that variations may be accomplished in view of these teachings without deviating from the spirit or scope of the present invention. As noted the pivoting coupling in a barrel could be located in front, back, or to the side of the corresponding partially elongated or radial slot. In addition, a cam based locking mechanism may be employed in the partially elongated or radial slot to releasably lock a barrel 20, 120 to an extension 26, 126.

What is claimed is:

1. An adornable binocular device including:
   a telescope pair, each telescope of the telescope pair including a rear, a front, and a line of sight;
   two arms with one of the telescope pair pivotally mounted to each arm;
   a pivoting coupling between each telescope and each arm at a first location on each telescope; and
   a releasably slideable coupling between each telescope and each arm at a second location on each telescope, the second location offset from the first location relative to the telescope line of sight, enabling independent line of sight convergence adjustment.

2. The adornable binocular device of claim 1, wherein the second location of each telescope is located more distal from the rear of the telescope than the first location.

3. The adornable binocular device of claim 2, further including a housing, the housing holding at least a portion of the two arms.

4. The adornable binocular device of claim 1, wherein each arm includes an elongated slot releasably slideably coupled to the second location of each telescope.

5. The adornable binocular device of claim 4, wherein the elongated slot in each arm forms a partial radial arc.

6. The adornable binocular device of claim 1, wherein the pivoting coupling includes a cavity in one of each telescope and arm and a protrusion in other of each telescope and arm, the protrusion dimensioned to at least partially rotate within the cavity.

7. The adornable binocular device of claim 1, wherein the pivoting coupling includes a cavity in each telescope and a protrusion in the corresponding arm, the protrusion dimensioned to at least partially rotate within the cavity.

8. The adornable binocular device of claim 1, wherein the pivoting coupling includes a pin and a cavity in each telescope and arm, the pin dimensioned to at least partially rotate within the cavity of one of the telescope and the arm.

9. The adornable binocular device of claim 1, wherein the releasably slideable coupling includes a cavity in each telescope, a channel in corresponding arm, and a locking mechanism, the locking mechanism dimensioned to extend through the channel and engage the telescope cavity.

10. The adornable binocular device of claim 9, wherein the locking mechanism includes a threaded screw.

11. The adornable binocular device of claim 9, wherein the channel forms an elongated slot.

12. An adornable binocular device including:
    two arms;
    a telescope pair, one of the telescope pair pivotally mounted to each arm and each telescope of the telescope pair including a rear, a front, a line of sight, a first cavity at a first location, and a second cavity at a second location, the second location offset from the first location relative to the telescope line of sight;

each arm including a protrusion and an elongated slot, the protrusion dimensioned to at least partially rotate within a corresponding telescope first cavity to form a pivoting coupling between each arm and a corresponding telescope and a locking mechanism dimensioned to extend from an elongated slot of one of the two arms to a corresponding telescope second cavity and releasably engage the second cavity to form a releasably slideable coupling between the arm and the corresponding telescope.

13. The adornable binocular device of claim 12, further including a housing, the housing holding at least a portion of the two arms.

14. The adornable binocular device of claim 12, wherein the second location of each telescope is located more distal from the rear of the telescope than the first location.

15. The adornable binocular device of claim 12, wherein the elongated slot in each arm forms a partial radial arc.

16. The adornable binocular device of claim 12, wherein the locking mechanism includes a threaded screw.

17. An adornable binocular device including:

two arms, each arm including a cavity and an elongated slot;

a telescope pair, one of the telescope pair pivotally mounted to each arm and each telescope of the telescope pair including a rear, a front, a line of sight, a protrusion at a first location, and a cavity at a second location, the second location offset from the first location relative to the telescope line of sight and the protrusion dimensioned to at least partially rotate within a corresponding arm cavity to form a pivoting coupling between the telescope and the corresponding arm; and a locking mechanism dimensioned to extend from an elongated slot of one of the two arms to a corresponding telescope cavity and releasably engage the cavity to form a releasably slideable coupling between the arm and the corresponding telescope.

18. The adornable binocular device of claim 17, further including a housing, the housing holding at least a portion of the two arms.

19. The adornable binocular device of claim 17, wherein the second location of each telescope is located more distal from the rear of the telescope than the first location.

20. The adornable binocular device of claim 17, wherein the elongated slot in each arm forms a partial radial arc.

21. The adornable binocular device of claim 17, wherein the locking mechanism includes a threaded screw.

* * * * *